United States Patent
Olita et al.

(10) Patent No.: US 7,369,174 B2
(45) Date of Patent: May 6, 2008

(54) HELMET-MOUNTED THERMAL IMAGING SYSTEM

(75) Inventors: Jules Olita, Blue Bell, PA (US); Owen Medd, Newtown, PA (US); Wesley Sheridan, Chalfont, PA (US)

(73) Assignee: Sage Technologies Ltd., Warminster, PA (US)

( * ) Notice: Subject to any disclaimer, the term of this patent is extended or adjusted under 35 U.S.C. 154(b) by 887 days.

(21) Appl. No.: 10/034,428

(22) Filed: Dec. 27, 2001

(65) Prior Publication Data

US 2003/0122958 A1 Jul. 3, 2003

(51) Int. Cl.
*H04N 5/225* (2006.01)

(52) U.S. Cl. ...................................... 348/373
(58) Field of Classification Search ............... 348/61, 348/64, 143, 373, 164, 216.1; 250/330; 345/8; 359/631, 630, 356, 815; 2/6.3
See application file for complete search history.

(56) References Cited

U.S. PATENT DOCUMENTS 5,089,914 A * 2/1992 Prescott ..................... 359/815
5,200,827 A * 4/1993 Hanson et al. ........... 348/216.1

(Continued)

FOREIGN PATENT DOCUMENTS

EP 1 107 041 A1 * 6/2001

(Continued)

Primary Examiner—John Miller
Assistant Examiner—Heather R. Jones
(74) Attorney, Agent, or Firm—Armand M. Vozzo, Jr.

(57) ABSTRACT

An improved thermal imaging camera system is adapted to be releasably mounted to a protective helmet typically worn by a firefighter or other emergency personnel at an incident site. The present system comprises a thermal imaging camera assembly having a single eyepiece display flexibly coupled thereto, a protective housing for the camera assembly and a specially adapted mounting bracket assembly for releasably stationing the camera assembly and its protective housing in a central position on the helmet. The camera assembly further includes and integrates a miniaturized infrared camera unit with associated battery power supply and control electronics for high resolution image production. The single eyepiece display is flexibly coupled to the camera assembly and its housing by means of an articulated arm that accommodates positioning of the display in front of either the left or right eye of the user-wearer with or without an air mask or other protective interface being worn over the face of the user-wearer. The mounting bracket assembly includes a T-shaped base bracket having a rectangular head adapted to be fixed in a level position on the front of the helmet and a C-shaped upper bracket attached to the bottom of the housing and formed to slidingly engage the head of the base bracket thereby holding the camera system in proper position on the helmet. Spring-loaded detents on opposite sides of the head of the base bracket serve to lock the bracket assembly together by engaging the sides of the upper bracket and further allow manual disengagement therefrom so that the camera system may be quickly removed from the helmet and rapidly deployed on another similarly equipped helmet.

7 Claims, 7 Drawing Sheets

U.S. PATENT DOCUMENTS

| | | | | |
|---|---|---|---|---|
| 5,584,073 | A | * | 12/1996 | Radzelovage et al. .......... 2/6.3 |
| 5,949,582 | A | * | 9/1999 | Coombs ..................... 359/630 |
| 6,255,650 | B1 | * | 7/2001 | Warner et al. ............. 250/330 |
| 6,476,391 | B1 | * | 11/2002 | Zhang ........................ 250/330 |
| 6,560,029 | B1 | * | 5/2003 | Dobbie et al. .............. 359/631 |
| 6,606,114 | B1 | * | 8/2003 | Gordon et al. ................ 348/64 |
| 6,683,584 | B2 | * | 1/2004 | Ronzani et al. ................ 345/8 |
| 6,859,327 | B2 | * | 2/2005 | Del Bianco et al. ........ 359/630 |
| 2002/0030163 | A1 | * | 3/2002 | Zhang ........................ 250/330 |
| 2003/0169491 | A1 | * | 9/2003 | Bender et al. .............. 359/356 |
| 2005/0035925 | A1 | * | 2/2005 | Ostromek et al. ............. 345/8 |

FOREIGN PATENT DOCUMENTS

| | | | |
|---|---|---|---|
| JP | 2004-244745 | * | 9/2004 |
| WO | WO 00/45211 | * | 8/2000 |

* cited by examiner

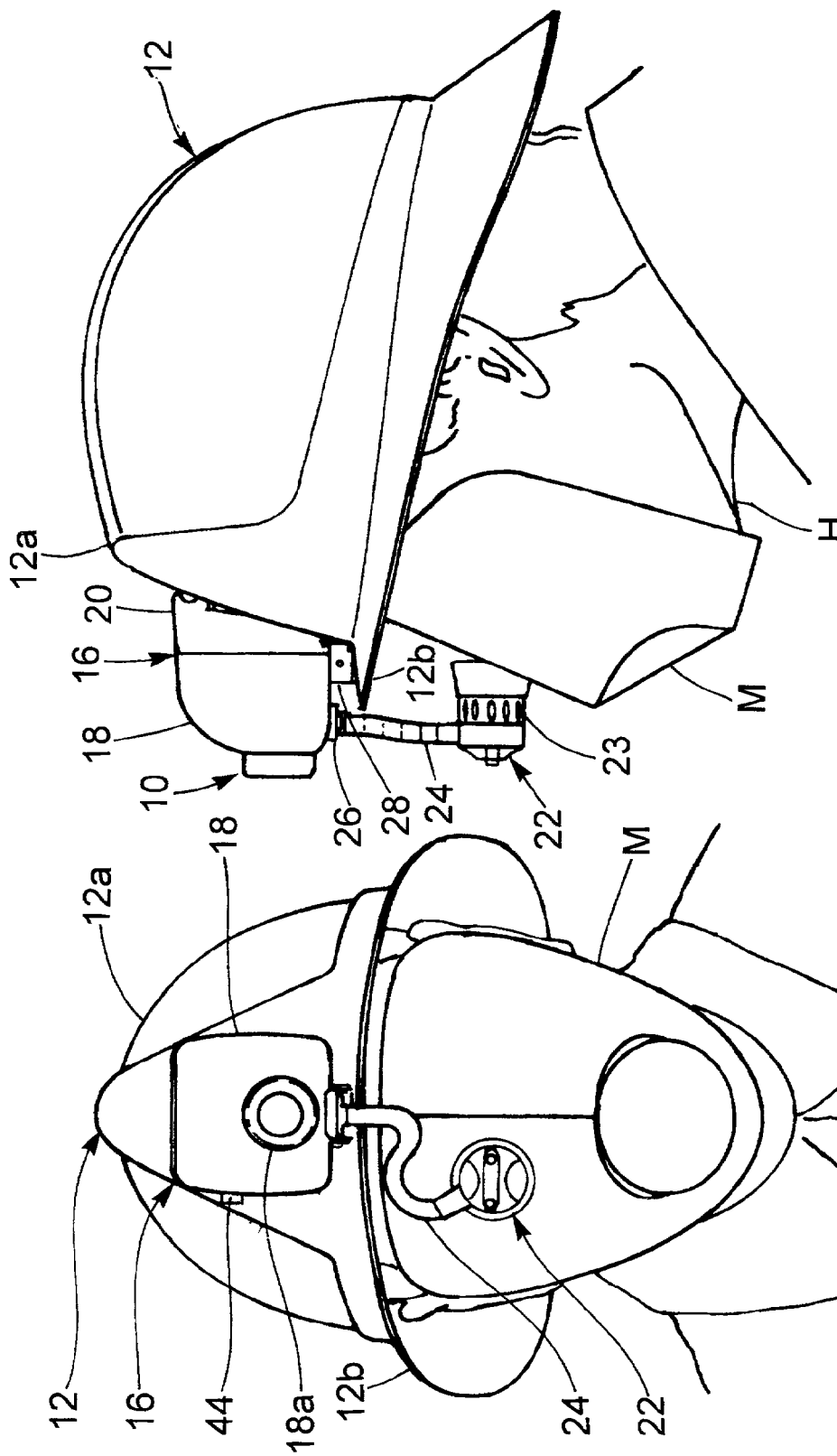

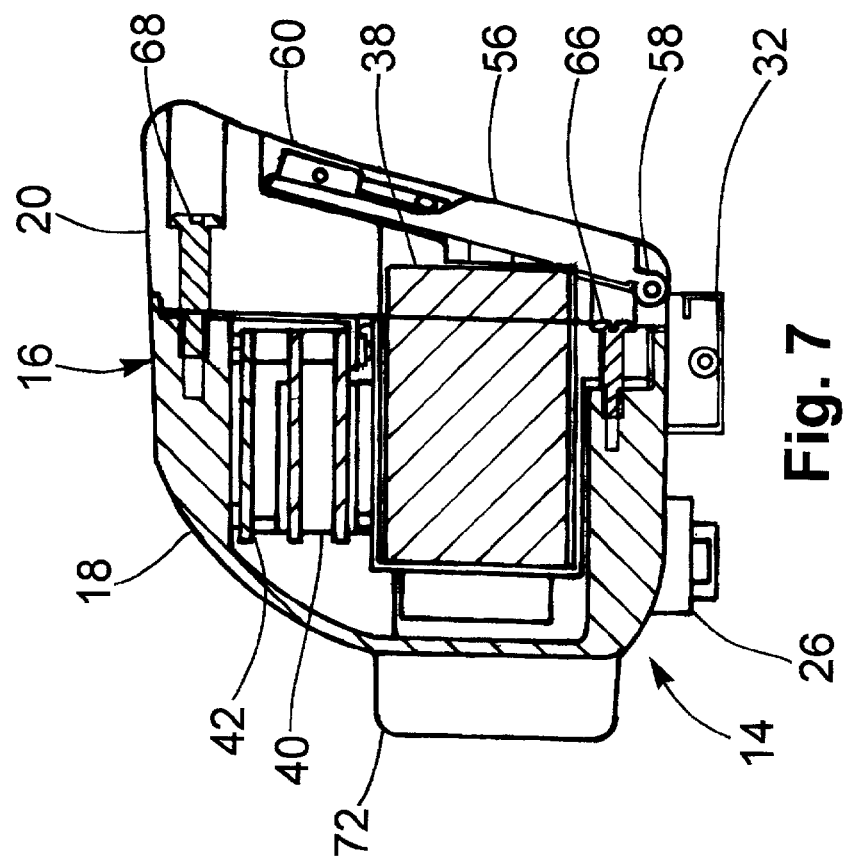
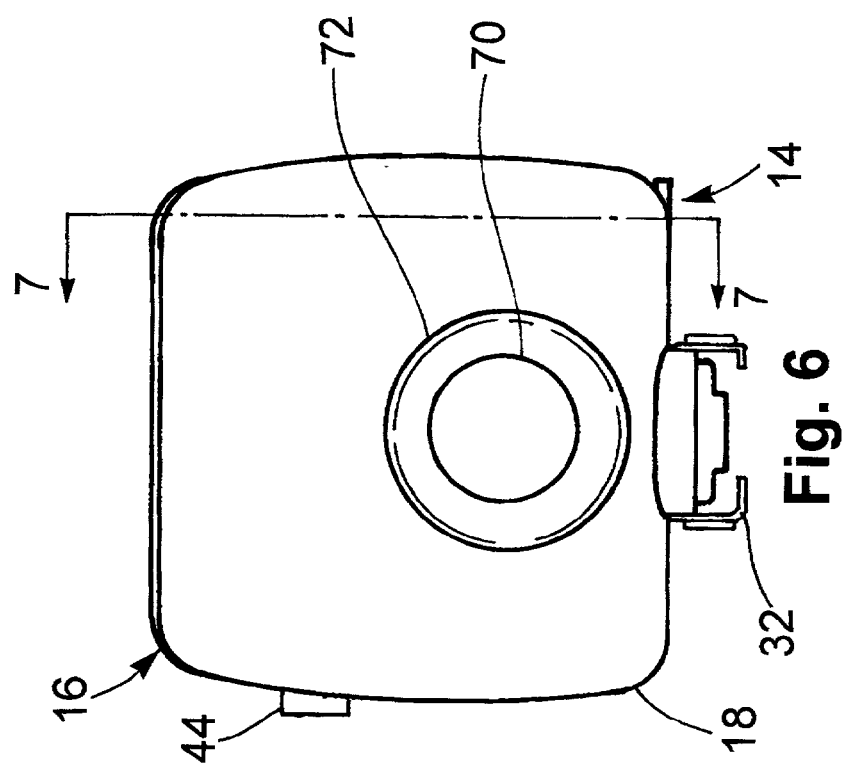

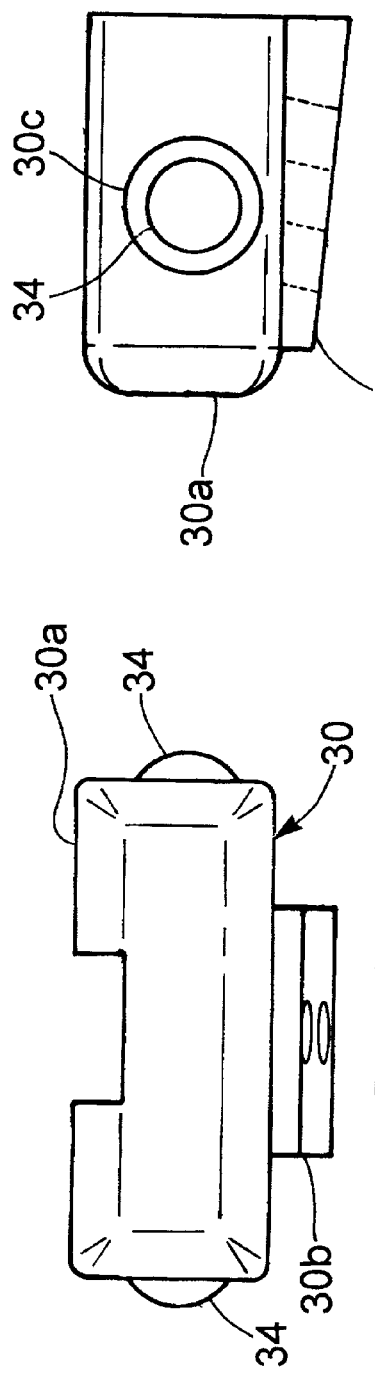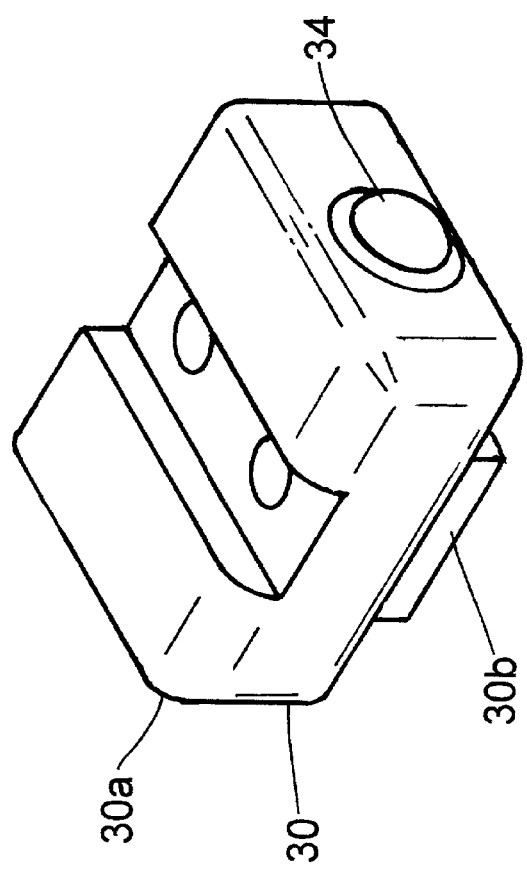

HELMET-MOUNTED THERMAL IMAGING SYSTEM

BACKGROUND OF THE INVENTION

The present invention relates to thermal imaging systems of the type applied for use in firefighting and search and surveillance operations, and more particularly to an improved helmet-mounted camera system that may be readily deployed and used to display a high resolution thermal image of an incident site directed to either eye of the user while maintaining direct visual contact of the user with the site to provide better visibility of the surrounding areas.

In the conduct of firefighting and certain search and surveillance operations, it is critical to the success and safety of the operations that operating personnel be able to see as much of the incident site as possible and observe as much evidence of site conditions as one can gather aided and assisted by specially designed and adapted sensor devices. Such sensor devices have included thermal or infrared imaging cameras adapted to be worn in connection with a protective helmet for providing the wearer with a visual display of the incident site and particularly, those objects that are otherwise obscured from the wearer's view due to dense smoke, darkness and other adverse conditions encountered at the scene. These thermal imaging devices, for further example, can allow the user-wearer to see a fire or other hot spot radiating infrared energy in proximity to the viewing site but obscured by a wall or roof.

Existing combinations of a head-protective helmet and a thermal imaging camera have proven useful to emergency operating personnel as a means for conducting immediate incident site surveillance and investigations about the site while having the hands of the personnel free to carry out particular tasks. Examples of such hands-free combinations of head-protective helmets and thermal imaging cameras are those disclosed in U.S. Pat. No. 5,089,914 issued to James A. Prescott and U.S. Pat. Nos. 6,016,160 and 6,023,288, both issued to Christopher E. Coombs et al. Another type of infrared system adapted for hands-free use in connection with a fire fighter's helmet is that disclosed in U.S. Pat. No. 6,255,650 issued to Charles C. Warner et al. Although existing helmet-mounted thermal imaging systems have been generally successful in providing a hands-free visual display of the obscured site conditions, the mounted arrangement and positioning of their cameras and associated displays have not been completely satisfactory in preserving a clear and natural field of view for the user-wearer while wearing the helmet-mounted system and in maintaining effective visual contact and the spatial orientation of the user-wearer while navigating the site.

SUMMARY OF THE INVENTION

Accordingly, it is a general purpose and object of the present invention to provide an improved helmet-mounted camera system better capable of assisting emergency personnel to work effectively and move about at an incident site with enhanced images of obscured areas being displayed without obstructing normal vision of the personnel.

A more particular object of the present invention is to provide a helmet-mounted infrared camera system that affords the user-wearer a clear and unobstructed field of view of the immediate incident site for use of his natural eyesight while displaying a thermal image of obscured areas of the same site for instant evaluation and analysis of the site conditions.

Another object of the present invention is to provide a helmet-mounted infrared camera system that better maintains normal visual contact and spatial orientation of the user-wearer with the incident site while affording enhanced thermal images of obscured areas to either eye of the user-wearer.

Still another object of the present invention is to provide a compact and lightweight yet rugged thermal imaging camera that is mobile and readily deployed from one location to another upon a standard protective helmet.

A still further object is to provide a helmet-mounted thermal imaging camera system that is hands free in its operation at the incident site and capable of being remotely monitored and recorded for post-incident review.

Briefly, these and other objects of the present invention are accomplished by an improved thermal imaging camera system adapted to be releasably mounted to a protective helmet typically worn by a firefighter or other emergency personnel at an incident site. The present system comprises a thermal imaging camera assembly having a single eyepiece display flexibly coupled thereto, a protective housing for the camera assembly and a specially adapted mounting bracket assembly for releasably stationing the camera assembly and its protective housing in a central position on the helmet. The camera assembly further includes and integrates a miniaturized infrared camera unit with associated battery power supply and control electronics for high resolution image production. The single eyepiece display is flexibly coupled to the camera assembly and its housing by means of an articulated arm that accommodates positioning of the display in front of either the left or right eye of the user-wearer with or without an air mask or other protective interface being worn over the face of the user-wearer. The mounting bracket assembly includes a T-shaped base bracket having a rectangular head adapted to be fixed in a level position on the front of the helmet and a C-shaped upper bracket attached to the bottom of the housing and formed to slidingly engage the head of the base bracket thereby holding the camera system in proper position on the helmet. Spring-loaded detents on opposite sides of the head of the base bracket serve to lock the bracket assembly together by engaging the sides of the upper bracket and further allow manual disengagement therefrom so that the camera system may be quickly removed from the helmet and rapidly deployed on another similarly equipped helmet.

For a better understanding of these and other aspects of the present invention, reference should be made to the following detailed description taken in conjunction with the accompanying drawings in which like reference numerals and characters designate like parts throughout the figures thereof.

BRIEF DESCRIPTION OF THE DRAWINGS

For a fuller understanding of the nature and objects of the present invention, references in the detailed description set forth below shall be made to the accompanying drawings in which:

FIG. 2 is a front elevation of the helmet-mounted thermal imaging camera system shown in FIG. 1;

FIG. 3 is a side elevation view of the helmet-mounted thermal imaging system shown in FIG. 2;

FIG. 6 is a front elevation view of the camera assembly contained in the housing and separated from its mounted position on the protective helmet;

FIG. 7 is a cross-sectional view of the camera assembly and housing taken along the line 7-7;

FIG. 8 is a front perspective view of the base bracket employed upon the protective helmet in accordance with the present invention to mount the camera system of FIGS. 1-3;

FIG. 9 is a side elevation of the base bracket shown in FIG. 8;

FIG. 10 is a downwardly viewed frontal perspective of the base bracket of FIGS. 8 and 9.

DETAILED DESCRIPTION OF THE INVENTION

Figure 1:
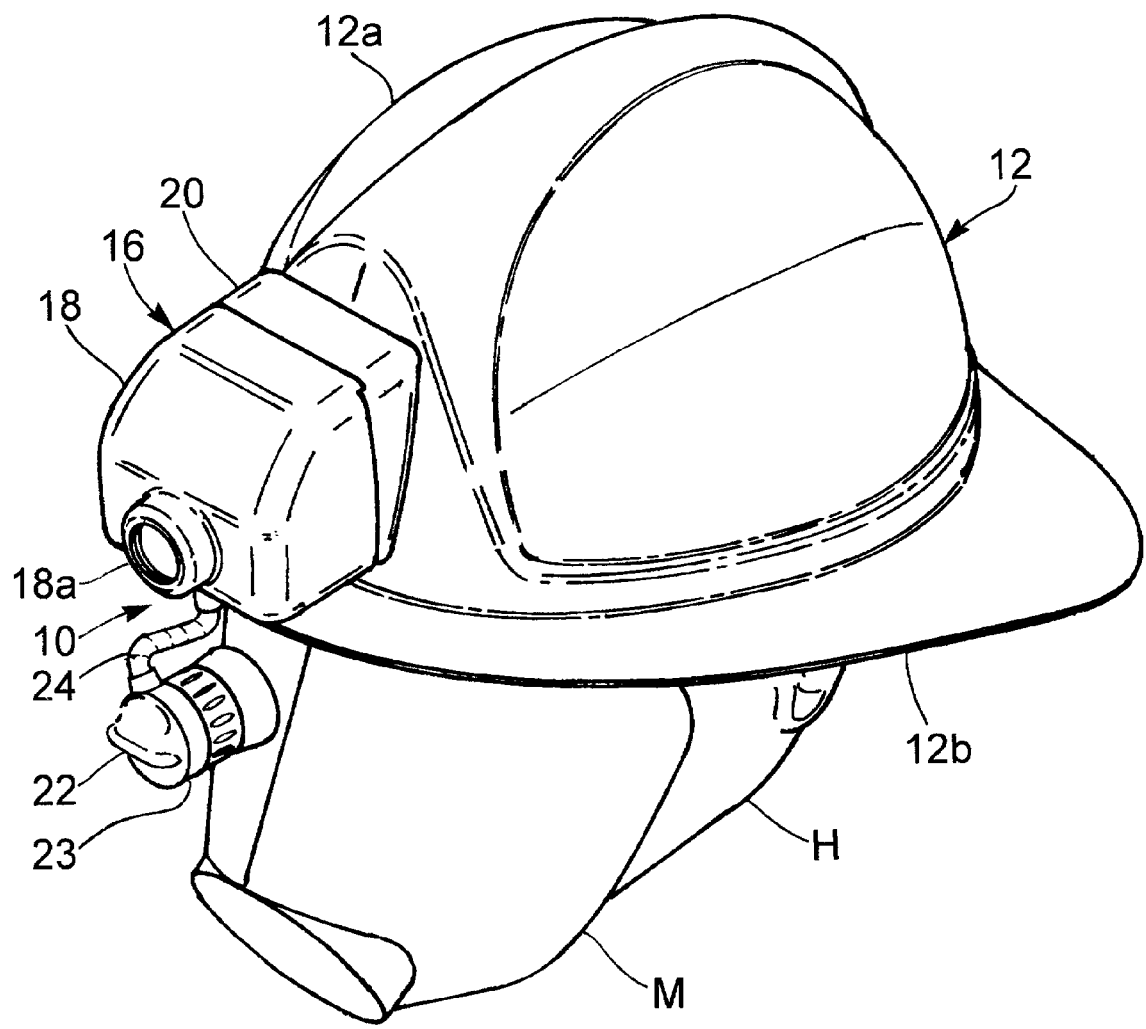
FIG. 1 is a perspective view of a thermal imaging camera system assembled and mounted upon a protective helmet in accordance with the present invention.

Referring now to the drawings and particularly to FIGS. 1-3, a thermal imaging camera system, generally designated 10, is shown assembled and mounted upon the front of a protective helmet 12 that is worn upon the head H of a firefighter or other emergency personnel. Further depicted in the present drawing figures is a protective mask M typically worn over the face of the firefighter in conjunction with the protective helmet 12. In accordance with the present invention, the thermal imaging camera system 10 comprises an infrared camera assembly 14, best viewed in FIGS. 4 and 5, that is fully contained within a protective housing 16, adapted to be releasably mounted to the brim 12b of the helmet 12 in a central position immediately forward of the helmet cap 12a. The protective housing 16 includes a front enclosure member 18 formed having a cavity, as described in greater detail below, to hold substantially all of the infrared camera assembly 14 in a forward facing position with a circular portal 18a provided in the forwardmost center of the front enclosure member to provide optical viewing access to the camera assembly with a field of view perpendicularly forward of the user-wearer. A rear enclosure member 20 is formed at its forward end to align and mate with the back of the front enclosure member 18 and inclined at its rear surface to conform with the generally sloped front surface of the helmet cap 12a.

The present camera system 10 further comprises a single eyepiece display 22 contained within a protective body 23. The eyepiece display 22 is flexibly coupled and electrically connected to the infrared camera assembly 14 by an articulated arm 24 mounted at its upper end to the bottom of the front enclosure member 18 through a mechanical fitting 26. The articulated arm 24 is a generally cylindrical member that is segmented and pivotable along its central axis to allow the arm to conform to a variety of angled configurations, each capable of being maintained until adjusted and reconfigured by the user-wearer. The articulated arm 24 serves to route electrical cable that carries processed video signals from the infrared camera assembly 14 to the single eyepiece display 22, the lower end of the articulated arm being mechanically fastened in the protective body 23 to support electrical connections to the display. The articulated arm 24 is formed having sufficient length to extend downward from the mounted camera assembly 14 and its housing 16 to the eye level of the user-wearer on either side, further positioning the single eyepiece display 22 immediately forward and facing either the right or left eye, with the protective mask M, if worn, as shown in the FIGS. 1-3, being situated between the display and the selected eye of the user-wearer.

Mounting of the present camera system 10 is effected along the centerline of the helmet 12 with the infrared camera assembly 14 and its protective housing 16 releasably coupled to the front brim 12b by a specially adapted bracket assembly 28. Described below in greater detail, the bracket assembly 28 comprises a base bracket member 30 fixed to the helmet brim 12b and a mating upper bracket member 32 attached to the bottom of housing 16, particularly to that of the front enclosure member 18, the separate bracket members being formed to engage each other along respective axes and interlock by means of spring-loaded detents 34 set on opposite sides of the base bracket member. In its engaged and locked position, the bracket assembly 28 holds the thermal imaging system 10 firmly in a stationary position on the protective helmet 12, as depicted in FIGS. 1-3, with the infrared camera assembly 14 forwardly directed along the centerline of the helmet in a substantially horizontal attitude and the single eyepiece display 22 extended therefrom and positioned just forward of the protective mask M facing the selected eye of the user-wearer. As shown and described below in reference to FIGS. 8-10, the manual release of the bracket assembly 28 disengages the base bracket member 30 from the upper bracket member 32 and allows the camera system 10 to be removed quickly and easily by the user-wearer for redeployment elsewhere.

Figure 4:
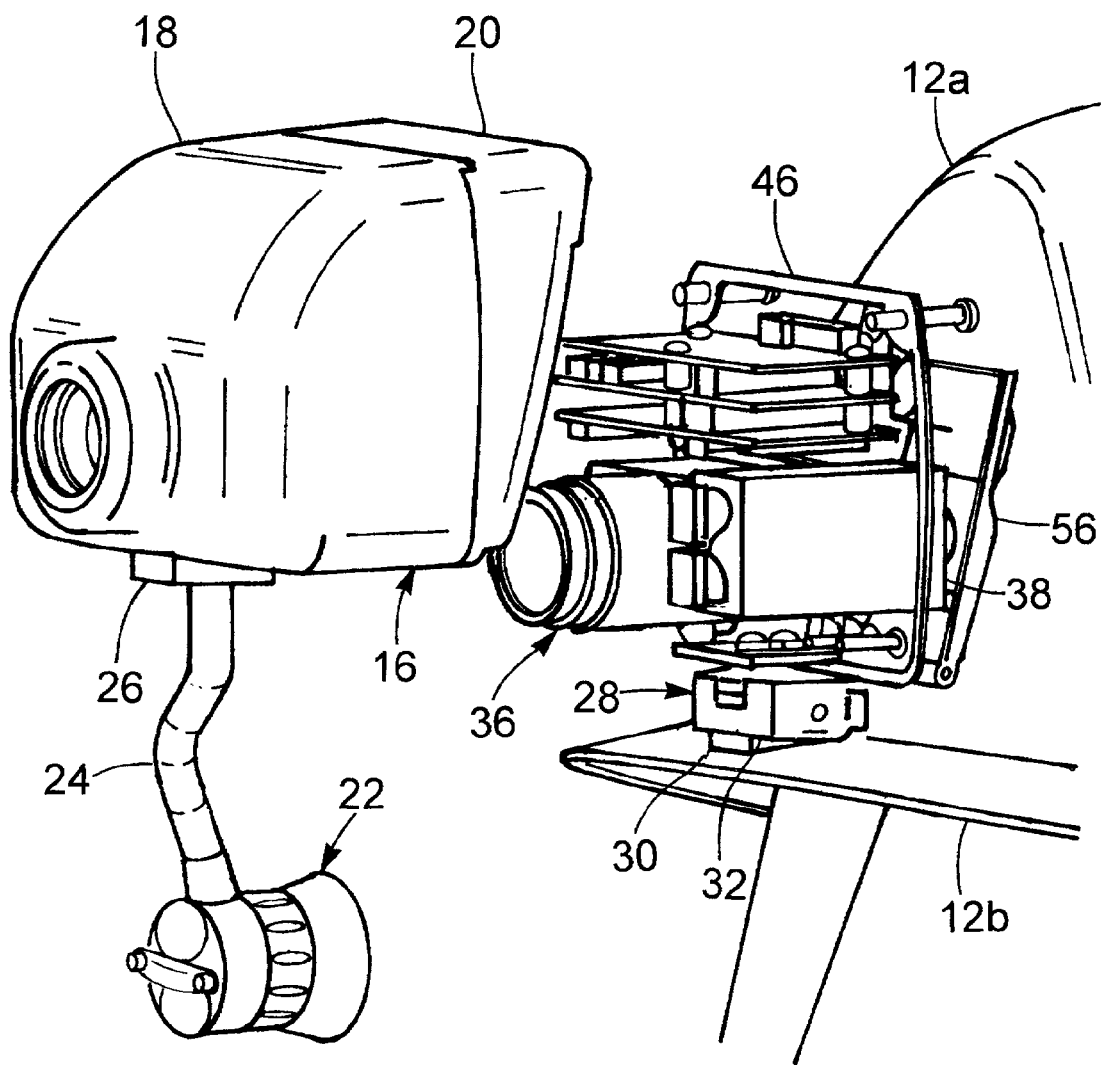
FIG. 4 is an isometric view of the present helmet-mounted camera system of FIG. 1 showing an exploded, partly assembled version to reveal interior details of the camera assembly.

Referring now to FIG. 4, the infrared camera assembly 14 is shown for purposes of this description in its assembled arrangement mounted upon the brim 12b of helmet 12 without the intended protection of housing 16. The camera assembly 14 includes a miniature infrared video camera unit 36 of a type commercially available and preferably incorporating a compact optical lens assembly with an un-cooled microbolometer sensor array having a 160×120 pixel or higher resolution format to detect thermal energy emitted from any observed scene within the field of view of the camera. The infrared camera unit 36 is designed to produce video signals that are indicative of the detected thermal energy and capable of being processed and converted into a high-resolution thermal image of the particular scene. The camera unit 36 is intended to operate on a low input voltage, typically about 3 Vdc, and has limited power consumption, drawing less than 1 Watt at 3 Vdc. One commercially available product found suitable for use as the infrared video camera unit 36 in the present thermal imaging system 10 is a derivative of Model Control IR 2000AS manufactured by Raytheon Company.

Figure 5:
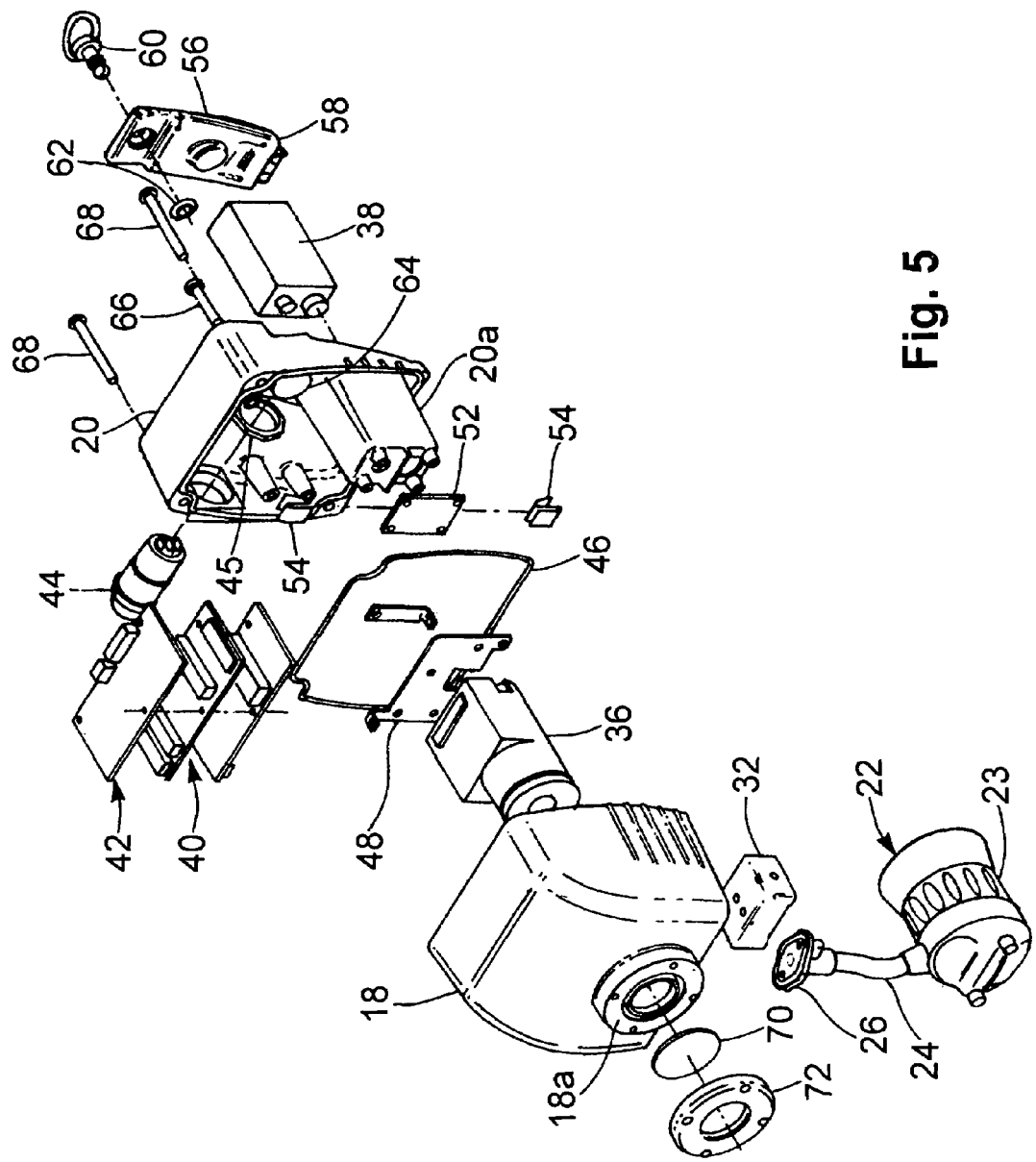
FIG. 5 is an exploded view in forward perspective of the camera assembly and the housing thereof used in accordance with the present invention.

The infrared video camera unit 36 is centrally positioned within the camera assembly and mounted having its sensor array forwardly facing and directed through the circular portal 18a of the front enclosure member 18. With the camera system 10 centrally mounted on the helmet 12 in a level position established by the bracket assembly 28, the attitude of the camera unit 36 is maintained substantially horizontal within the housing 16 so that the field of view of the camera unit projects directly forward of the user-wearer when the system is in use. A bracket plate 48, better viewed and described below in reference to FIG. 5, is transversely positioned within the protective housing 16 to engage the back end of the infrared video camera unit 36 and mount it in proper operating position within the housing. A standard 9-volt dc battery 38 is employed within the camera assembly 14 and serves as power source for the present camera system 10 and its component electronics, as better shown in FIG. 11. The battery 38 is held in place within the camera assembly 14 and stored alongside the camera unit 36 in a battery compartment 20a, shown in FIG. 5, that is rectangularly formed as an integral part of rear enclosure member 20. The battery compartment 20a is open at the rear to allow insertion and removal of the battery 38 and a battery door 56 pivotally connected to the rear enclosure member 20 is used to secure the open end of the compartment and contain the battery in place during use and operation of the camera system 10. Further mounted to the bracket plate 48 within camera assembly 14 are integrated electronics on respective printed circuit boards 40 and 42 designed to perform digital signal processing and image display enhancement of the thermal image video signals generated by the infrared camera unit 36. As better shown in FIG. 11, the separate signal processor electronics on the respective circuit boards 40 and 42 are each electrically coupled to the battery 38 for operating power and together connected in series to feed a digitally processed and enhanced output signal to the display 22 that is reflective of the thermal image detected by the infrared camera unit 36.

Figure 11:
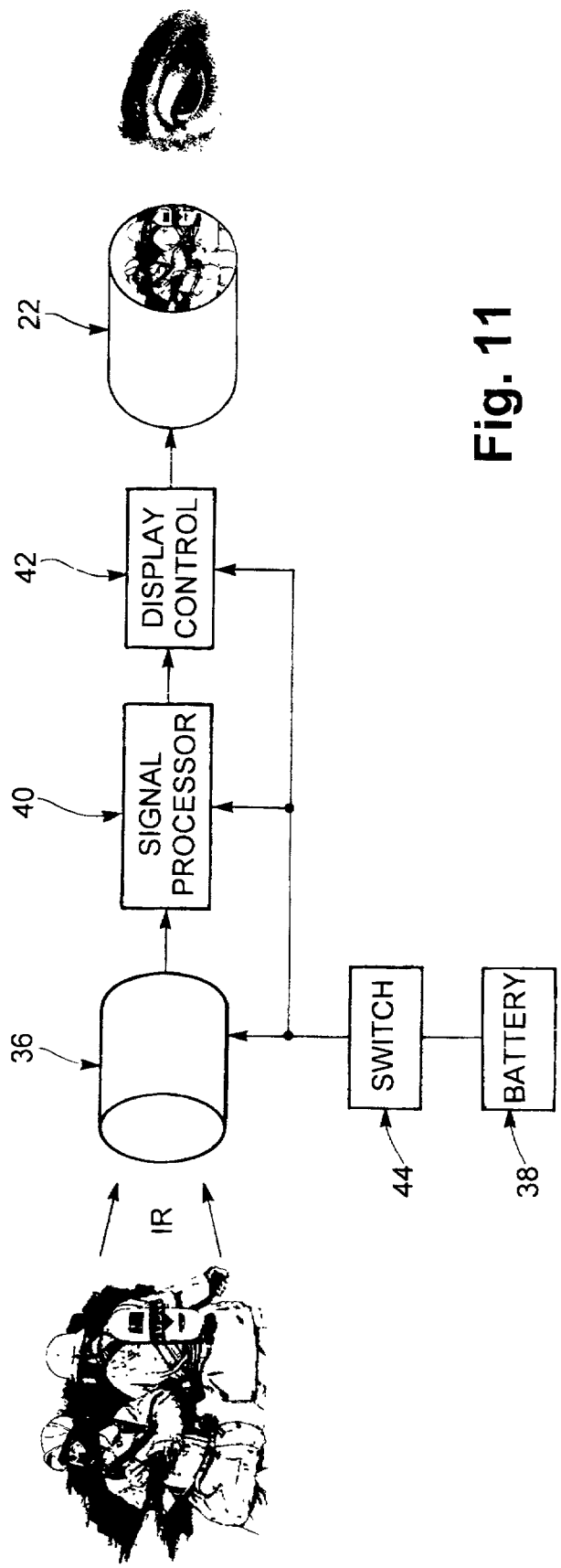
FIG. 11 is a block diagram of the opto-electronics contained within the infrared camera assembly of the present thermal-imaging camera system.

Referring more particularly to FIG. 11, the digitally processed and enhanced video signals outputted from the respective signal processor and image display boards 40 and 42 are inputted to the single eyepiece display 22 through the cable incorporated within the articulated arm 24. The signal processor board 40 contains conventional electronics designed to digitally convert and enhance the analog video signals generated by the infrared camera unit 36, while the image controller board 42, also of conventional electronic design, further enhances the digital signal received from the signal processor board 40 and resolves it for thermal image generation on display 22. The single eyepiece display 22 is preferably a self-contained and integrated LED microdisplay of a type that is commercially available and designed to generate color or black and white images based on the video signals received at its input. The display unit 22 is particularly designed to receive a composite monochrome signal and producing therefrom a high-resolution camera image with up to 256 gray shades capable of being displayed on a pixel array. Preferably having a highly integrated design, drivers for the pixel array, including a serial interface and registers with level adjustments for contrast, brightness and display orientation, one suitable such display unit for use in the present system 10 is the SVGA+AMOLED microdisplay product of the eMagin Corporation.

Referring now to FIGS. 5-7, the assembled members of the protective housing 16, namely, the front enclosure 18, rear enclosure 20 and battery door 56 are formed for interengagement with each other to provide a substantially sealed chamber within which the infrared camera unit 36, the battery 38 and associated electronics boards 40 and 42 are disposed for proper operation and protected from heat, moisture and other harsh conditions generally found at the fire or emergency scene. The front enclosure 18, rear enclosure 20 and battery door 56 are preferably molded and fabricated from a synthetic plastic material having high heat, flame and chemical resistance and excellent mechanical properties in order to construct the compact and protective housing 16 for the camera assembly 14.

The front enclosure 18 is a contoured member having a curved and sloping facing surface with portal 18a formed centrally therethrough. The top, bottom and lateral surfaces of the front enclosure member 18 are relatively flat and essentially rectangular in their disposition so that a substantially rectangular opening is provided at the back of the front enclosure member to cover the forwardly facing infrared camera unit 36 and join with the forwardly facing surface of the rear enclosure member 20. The cavity of the front enclosure member 18 is formed to accept the infrared camera unit 36 and its associated electronics boards 40 and 42 along with the battery compartment 20a projecting forward from the rear enclosure member 20. The cavity of the front enclosure member 18 and its surrounding wall sections allow the infrared camera unit 36 and its forwardly facing sensor array to align with and rest in immediate proximity to the portal 18a so that the camera unit is provided with a clear field of view therethrough. A protective lens 70 made of a germanium glass or similar material transmissive to infrared radiation is formed to fit onto the front of the portal 18a to reduce the effects of incident heat energy on the camera unit 36. A ring-like cover 72 made of the same plastic material as that of the front enclosure 18 is fastened thereto and used to secure the protective lens 70 in place over the portal 18a.

The rear enclosure member 20 is made of the same plastic material as that of the front enclosure 18 and fabricated, using conventional molding techniques, to provide a contoured back cover for the infrared camera assembly 14. The rear enclosure member 20 is formed having a sloped back surface intended to conform to the slope typically evident on the front of the cap 12a of the protective helmet 12 and an open front end having a substantially rectangular cross-section that conforms for mating engagement with the back of the front enclosure member 18. Within the cavity of the rear enclosure member 20 formed by the sloped back surface and rectangular top, bottom and lateral surfaces, the battery compartment 20a is integrally formed and made to forwardly project from the sloped back surface through the open front end of the rear enclosure. The battery compartment 20a is rectangular formed to hold the battery 38 longitudinally therein and is provided with circular openings at its forwardmost end through which the terminals of the battery may properly register and make proper contact with an electrical plate 52 and its polar connector clips 54. The open back end of the battery compartment 20a allows loading and unloading of the battery 38 and is intended to be closed and sealed using the battery door 56. The battery door 56 is preferably made of the same plastic material as the front and rear enclosure member 18 and 20 and is fabricated to specifically conform with the sloped back surface of the rear enclosure when in its closed position. The battery door 56 is pivotally connected to the back surface of the rear enclosure member 20 by means of a hinge pin 58 transversely disposed at the bottom of the battery door and made to engage the lower end of the rear enclosure below the battery compartment 20a. A conventional ring head fastener 60 disposed within an opening near the top of the battery door 56 and held therein by a retainer ring 62, is used to secure the battery door in a substantially sealed and closed position by means of rotational engagement with a receptacle lock 64 mounted in the rear enclosure member 20. A standard push-button electrical switch 44 is housed and mounted relatively flush to the upper side wall of the rear enclosure member 20 opposite from the battery compartment 20a using an associated fastener nut 45. The switch 44 is electrically coupled to the battery 38, as shown in FIG. 11, serving to control operating power to the infrared camera unit 36 and its associated electronics boards 40, 42 and activating the camera assembly 14 when needed by the user.

The front and rear enclosure members 18 and 20 are engaged and joined together about their respective mating open ends with an enclosure seal 46, made of a soft silicone rubber material and conforming in shape to each of the open ends, being positioned and secured between the front and rear enclosures. The front and rear enclosure members 18 and 20 and intermediate seal 46 are held together using conventional screw fasteners 66 and 68 inserted and secured within corresponding holes provided in the bottom and top wall sections of respective enclosure members on either side thereof.

The single eyepiece display 22 in its protective body 23 is mounted beneath the front enclosure member 18 in an extended and movable position on the lower end of the articulated arm 24. The protective body 23 is made substantially cylindrical in form to surround the display 22 and permit its view from one end thereof. The protective body 23 is fabricated preferably from a plastic material similar to that of the housing 16 for maximizing protection and shielding the display 22 and its elements from the heat, moisture and other adverse conditions. Opposite from the protective body 23 at the upper end of the articulated arm 24, fitting 26 is secured to the bottom wall of the front enclosure member 18, the fitting being mounted near the forward end of the front enclosure. The upper end of the articulated arm 24 is adapted to engage the fitting 26 and be retained mechanically therein to support the movable positions of the display 22 on the articulated arm. As is best seen in FIGS. 1-3, the mounted position of the fitting 26 and the articulated arm 24 forward on the bottom of the housing 16 and its front enclosure 18 allows the display 22 to depend therefrom clear of the brim 12b and directly in proper position in front of the selected eye of the user.

The upper bracket member 32 has a substantially rigid body formed having a C-shaped cross-section and preferably made of a strong and durable material. Mounted in an axial direction on the bottom of the front enclosure 18 rearward of the location of fitting 26, the body of the upper bracket member 32 is formed having top, front and side walls that are substantially rectangular and an open end rearwardly facing when mounted so that the upper bracket may axially engage the body of the base bracket 30, as conformed and mounted in the description detailed below with reference to FIGS. 8-10. The top wall of the upper bracket 32 is adapted for mounted attachment to the bottom of the front enclosure 18 and together with the front and side walls provide a C-shaped cross-sectional structure that serves to retain the conforming body of the base bracket 30 within the structure of the upper bracket when the bracket members are axially engaged. A hole formed near the middle along each side wall of the upper bracket member 32 is provided to register the spring-loaded detents 34 mounted on either side of the base bracket member 30 and thereby lock the bracket members together until disengaged manually.

Referring now more particularly to FIGS. 8-10 in conjunction with the foregoing figures, the bracket assembly 28 is comprised of the separate base and upper bracket members, 30 and 32 respectively, each formed having complementary configurations that permit their manual engagement and release when required. The base bracket member 30 made of a similar material to that of the mating upper bracket 32, is fabricated having a T-shaped body that comprises a block-like head section 30a with a substantially rectangular cross-section and a stem section 30b that depends perpendicularly from the bottom of the head section. The head section 30a of the base bracket member 30 is shaped to conform and fit within the upper bracket member 32 in an axial direction and is further provided with recessed counterbores 30c on opposite sides that are intended to align with the holes formed on the opposite side walls of the upper bracket. The counterbores 30c are sized to hold conventional spring-loaded detents 34 securely within their respective chambers in position to engage the holes on the respective side walls of the upper bracket 32, allowing the detents to project sufficiently from the opposite sides of the head section 30a, as best viewed in FIG. 8. The stem section 30b is integrally formed beneath the head section 30a and fabricated having an inclined bottom surface that is intended to correspond with the surface of the helmet brim 12b in order to set the base bracket 30 and its head section in a substantially horizontal position when mounted on the helmet 12. A pair of mounting holes axially aligned along the body of the base bracket member 30 are formed through the stem section 30b at right angles to the bottom surface thereof and made to extend through the head section 30a to permit attachment of the base bracket to brim 12b of the helmet 12 along its centerline using conventional mechanical fasteners. The head section 30a may be slotted at the top thereof along the axial line of the mounting holes to permit the fasteners to set within the rectangular profile of head section when in mounted position.

With the base bracket member 30 attached to the brim 12b of the helmet 12, the upper bracket 32 secured to the bottom of the housing 16 is axially aligned and placed over the head section 30a to initiate mounting of the camera assembly 14. The upper bracket 32 is made to slide over and upon the base bracket 30 until the bracket assembly 28 is fully engaged and locked in position by the spring-loaded detents 34 registered on the opposite side walls of the upper bracket. To release and redeploy the camera assembly 14 and its associated display 22, the detents 34 may be depressed manually disengaging the bracket assembly 28 and allowing the camera assembly and display to be removed from the helmet 12.

The described thermal-imaging system 10 and its mounted arrangement along the centerline of the helmet 12 not only balances the weight distribution thereon but more importantly establishes the field of view of the camera assembly 14 directly forward and normal to the facing direction of the user-wearer. With the helmet 12 properly seated and positioned on the head H, the present mounted arrangement of the thermal imaging system 10 sets the field of view of the camera assembly 14 in position to converge between the eyes of the user-wearer and thus permits the display 22 to present a normal, more natural image to the selected eye of the user. This central positioning of the mounted camera assembly 14 and its normally directed field of view eliminate the adverse effects of parallax in viewing the displayed images that can cause spatial discontinuities and disorientation of the user-wearer particularly when moving about.

Therefore, it is apparent that the described invention provides an improved helmet-mounted camera system better capable of assisting firefighters and other emergency personnel to work more effectively and better move about at an incident site by displaying enhanced images of obscured areas to the user-wearer without obstructing his normal vision. The disclosed helmet-mounted thermal imaging system particularly affords the user-wearer a clear and unobstructed field of view of the incident site surrounding him necessary for his movement while displaying a thermal image of obscured areas of the site necessary for careful investigation and analysis of the site conditions. The present helmet-mounted system better maintains the normal visual contact and spatial orientation of the user-wearer with the incident site while affording enhanced thermal images of obscured areas to either eye of the user-wearer. In addition, the present invention provides a compact and lightweight yet rugged thermal imaging camera system that can be easily moved and deployed from one location to another. The disclosed helmet-mounted camera system further allows the user-wearer to move about the incident site unimpaired and with his hands free to carry additional equipment and to perform manual tasks as may be required.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a future time to perform the same function as the present described embodiment are therefore considered to be part of the present invention. For example, the bracket assembly 28 may be modified in its structural form and positioning relative to the camera assembly 14 and its housing 16 to accommodate centerline mounting on the cap of a protective helmet without a forward brim. Accordingly, it is understood that this invention is not limited to the particular embodiment described, but rather is intended to cover modifications within the spirit and scope of the present invention as may be expressed in appended claims.

What is claimed:

1. A thermal imaging system intended for use upon a helmet worn by a person observing a scene at a fire or other incident site, comprising:
    infrared camera means assembled and releasably mounted in a stationary position along the centerline of the helmet for producing video signals reflective of thermal images of the scene viewed along the centerline, said infrared camera means comprising an infrared camera having a sensor array forwardly positioned to detect infrared radiation emanating from the scene for producing electrical signals indicative thereof, signal processor means connected to receive the electrical signals from said infrared camera for generating processed video signals based thereon indicative of thermal images of the scene, battery means connected to said infrared camera and said signal processor means for providing electrical power thereto, and housing means for containing said infrared camera, said signal processor means and said battery means in an assembled camera arrangement wherein the sensor array of said infrared camera is forwardly disposed to receive the infrared radiation emanating from the scene, said housing means comprising a front housing member formed having a cavity to substantially contain the assembled camera arrangement therein and further having a portal centrally therethrough to permit transmission of the infrared radiation emanating from the scene to the sensor array of said infrared camera, a rear housing member connected to said front housing member and formed to enclose the cavity thereof, said rear housing member being further formed to provide an interior compartment to hold said battery means, and a battery door pivotally connected to said rear housing member to close the interior compartment therein;
    eyepiece display means extended from said infrared camera means and adjustably connected thereto for presenting thermal images of the scene to either eye of the person based on the video signals from said infrared camera means; and
    bracket means assembled and interconnected between said infrared camera means and the helmet, said bracket means being axially aligned with the centerline of the helmet and interlocked therealong for releasably mounting said infrared camera means in the stationary position along the centerline of the helmet.

2. A thermal imaging system according to claim 1, wherein said eyepiece display means comprises:
    an eyepiece display electrically connected to receive the processed video signals from said signal processor means for producing thermal images therefrom; and
    an articulated arm connected to said housing means and adjustably configured to extend said eyepiece display therefrom in a position forward of either eye of the person.

3. A thermal imaging system according to claim 1, wherein said bracket means comprises:
    a first bracket member attached to said housing means in an axial direction, said first bracket member being formed having an open rectangular configuration with a C-shaped cross-section;
    a second bracket member attached to the helmet in an axial direction and along the centerline of the helmet, said second bracket member being formed having a rectangular configuration conformed to fit axially within the open rectangular configuration of said first bracket member; and
    detent means secured to said second bracket member and transversely disposed thereon to releasably interlock said first and second bracket members when axially engaged.

4. A thermal imaging camera system for use upon a helmet having a brim and worn by a person observing a scene at a fire or other incident site, comprising:
    infrared camera means assembled and adapted to be mounted in a stationary position upon the brim of the helmet, said infrared camera means being disposed to view the scene along the centerline of the helmet for generating processed video signals reflective of thermal images of the scene and further comprising an infrared camera having a sensor array forwardly positioned to detect infrared radiation emanating from the scene for producing electrical signals indicative thereof, signal processor means connected to receive the electrical signals from said infrared camera for generating processed video signals based thereon indicative of thermal images of the scene, battery means connected to said infrared camera and said signal processor means for providing electrical power thereto, and housing means for containing said infrared camera, said signal processor means and said battery means in an assembled camera arrangement wherein the sensor array of said infrared camera is forwardly disposed to receive the infrared radiation emanating from the scene, said housing means further comprising a front housing member formed having a cavity to substantially contain the assembled camera arrangement therein and a portal centrally therethrough to permit transmission of the infrared radiation emanating from the scene to the sensor array of said infrared camera, a rear housing member connected to said front housing member and formed to enclose the cavity thereof, said rear housing member being further formed to provide an interior compartment to hold said battery means, and a battery door pivotally connected to said rear housing member to close the interior compartment therein;

eyepiece display means electrically connected to said infrared camera means and flexibly extended therefrom for displaying thermal images of the scene to either eye of the person based on the video signals generated from said infrared camera means; and bracket means assembled and interconnected between said infrared camera means and the brim of the helmet, said bracket means being axially aligned with the centerline of the helmet and interlocked therealong for releasably mounting said infrared camera means in the stationary position along the centerline of the helmet.

5. A thermal imaging camera system according to claim 4, wherein said eyepiece display means comprises:

an eyepiece display electrically connected to receive the processed video signals from said signal processor means for producing thermal images therefrom; and an articulated arm connected to said housing means and adjustably configured to extend said eyepiece display therefrom in a position forward of either eye of the person.

6. A thermal imaging camera system according to claim 4, wherein said bracket means comprises:

a first bracket member attached to said housing means in an axial direction, said first bracket member being formed having an open rectangular configuration with a C-shaped cross-section;

a second bracket member attached to the brim of the helmet in an axial direction and along the centerline thereof, said second bracket member being formed having a rectangular configuration conformed to fit axially within the open rectangular configuration of said first bracket member; and detent means secured to said second bracket member and transversely disposed thereon to releasably interlock said first and second bracket members when axially engaged.

7. A thermal imaging system intended for use upon a helmet worn by a person observing a scene at a fire or other incident site, comprising:

infrared camera means assembled and releasably mounted along the centerline of the helmet for producing video signals reflective of thermal images of the scene viewed along the centerline, said infrared camera means comprising an infrared camera having a sensor array forwardly positioned to detect infrared radiation emanating from the scene for producing electrical signals indicative thereof, signal processor means connected to receive the electrical signals from said infrared camera for generating processed video signals based thereon indicative of thermal images of the scene, battery means connected to said infrared camera and said signal processor means for providing electrical power thereto, and housing means for containing said infrared camera, said signal processor means and said battery means in an assembled camera arrangement wherein the sensor array of said infrared camera is forwardly disposed to receive the infrared radiation emanating from the scene;

eyepiece display means extended from said infrared camera means and adjustably connected thereto for presenting thermal images of the scene to either eye of the person based on the video signals from said infrared camera means; and bracket means releasably engaged and coupled between said infrared camera means and the helmet for mounting said infrared camera means along the centerline of the helmet, a first bracket member attached to said housing means in an axial direction, said first bracket member being formed having an open rectangular configuration with a C-shaped cross-section, a second bracket member attached to the helmet in an axial direction and along the centerline of the helmet, said second bracket member being formed having a rectangular configuration conformed to fit axially within the open rectangular configuration of said first bracket member, and detent means secured to said second bracket member and transversely disposed thereon to releasably interlock said first and second bracket members when axially engaged.

* * * * *